United States Patent [19]
Hatakeyama et al.

[11] Patent Number: 5,881,116
[45] Date of Patent: Mar. 9, 1999

[54] METHOD FOR MEASURING THE CONTAMINATION PROFILE OF THE INNER SURFACES OF RADIOACTIVELY CONTAMINATED PIPES

[75] Inventors: Mutsuo Hatakeyama; Hirokuni Itoh; Satoshi Yanagihara, all of Ibaraki-ken, Japan

[73] Assignee: Japan Atomic Energy Research Institute, Tokyo, Japan

[21] Appl. No.: 926,038

[22] Filed: Sep. 9, 1997

[30] Foreign Application Priority Data

Sep. 12, 1996 [JP] Japan ................................. 8-242037

[51] Int. Cl.⁶ ............................................... G21C 17/00
[52] U.S. Cl. ............................................................ 376/245
[58] Field of Search ........................... 376/245, 249

[56] References Cited

U.S. PATENT DOCUMENTS 5,574,758  11/1996  Murakami et al. .................... 376/245

*Primary Examiner*—Daniel D. Wasil
*Attorney, Agent, or Firm*—Banner & Witcoff, Ltd.

[57] ABSTRACT

In a method of measuring the contamination profile of the inner surfaces of a radioactively contaminated pipe embedded within a concrete structure in a nuclear reactor facility, the detecting surface of a detector to be inserted into the contaminated pipe is fitted with a movable shield plate or cover, which is moved by a specified distance and the radioactive contamination profile within a limited area of the inner surfaces of the pipe is measured in terms of the difference in radiation intensity measured in two states, one where the shield plate or cover is in contact with the detecting surface and the other where it is spaced from the latter.

3 Claims, 6 Drawing Sheets

MEASURING β— AND γ—RAYS
(WITH THE SHIELD PLATE SPACED
FROM THE DETECTING SURFACE)

MEASURING γ—RAYS
(WITH THE SHIELD PLATE IN CONTACT
WTH THE DETECTING SURFACE)

MEASURING β— AND γ—RAYS
(WITH THE SHIELD PLATE SPACED
FROM THE DETECTING SURFACE)

MEASURING γ—RAYS
(WITH THE SHIELD PLATE IN CONTACT
WTH THE DETECTING SURFACE)

MEASURING β— AND γ—RAYS
(WITH THE SHIELD COVER OPEN)

MEASURING γ—RAYS
(WITH THE SHIELD COVER CLOSED)

MEASURING β— AND γ—RAYS    MEASURING γ—RAYS

METHOD FOR MEASURING THE CONTAMINATION PROFILE OF THE INNER SURFACES OF RADIOACTIVELY CONTAMINATED PIPES

BACKGROUND OF THE INVENTION

This invention relates to a method by which the radioactive contamination profile of pipes that are embedded within concrete structures in the premises of a nuclear reactor facility and which have been contaminated radioactively during the operation of the facility can be evaluated through measurement of β-rays. The method is applicable not only to the measurement and evaluation of the radioactive contamination profile of pipes embedded in a nuclear reactor facility scheduled to be decommissioned but also to other areas of radiation measurement and evaluation of the inner surfaces of pipes embedded in concrete structures including those of RI (radioisotope) utilizing facilities.

The inner surfaces of pipes in nuclear reactor facilities are contaminated radioactively by nuclides such as $^{60}$Co, $^{63}$Ni and $^{137}$Cs originating from nuclear fission or from the corrosion products formed as the result of circulation of primary coolants and the like in the nuclear reactor facilities. Most of the contaminating nuclides emit β- and γ-rays. In order to measure the radioactive contamination profile of the inner surfaces of the contaminated pipes, a β- or γ-ray detector is inserted into the pipe of interest and the intensity of its radioactivity is measured. To meet this need, the detector must be small and yet have high sensitivity.

In the conventional measurement of the radioactive contamination profile of the inner surfaces of contaminated pipes, a germanium semiconductor detector, a sodium iodide type detector and the like are used to measure γ-rays. However, the germanium semiconductor detector requires the cooling of the solid-state radiation probe with liquid nitrogen and, in addition, the great penetrating power of γ-rays requires the provision of a collimator which limits the surface of measurement; these have been an obstacle to the effort to reduce the size of the detector. Similarly, the sodium iodide type detector requires the provision of a collimator for limiting the surface of measurement and this has also been an obstacle to the effort to realize size reduction.

Another approach that could be taken for radiation measurement is by cutting a sample of the pipe of interest but this method is not practically feasible if the pipe is embedded in a concrete structure.

SUMMARY OF THE INVENTION

FIG. 1 illustrates a conventional method of evaluating the profile of radioactive contamination through the measurement of β-rays. As shown, a G-M type survey meter or a plastic scintillation detector 1 is inserted into a pipe and the detecting surface 2 measures β-rays to obtain the contamination profile on the inner surfaces of the pipe. This method, however, has had a problem in that with the detecting surface being located at the distal end of the inserted detector, the contaminated area from which β-rays are emitted or the area for β-ray measurement cannot be specified. Another problem with the G-M type survey meter is that it detects not only β-rays but also y-rays and with insufficient compensation for γ-rays in the detection of β-rays, it has been impossible to obtain the correct contamination profile.

The present invention has been accomplished under these circumstances and has as an object realizing simple and sensitive measurement of β-rays by specifying the area of the inner surfaces of a pipe to be measured and eliminating the problem with the compensation for γ-rays.

DETAILED DESCRIPTION OF THE INVENTION

In accordance with the invention, a shield plate or otherwise shaped plate typically made of aluminum is fitted on the outside of a detector to be inserted into a contaminated pipe and moved by a certain distance to achieve precise measurement of β-rays. Stated more specifically, the shield plate fitted on the outside of the detector inserted into the contaminated pipe is moved by a specified distance from the detecting surface and the contamination profile within a limited area of the inner surfaces of the pipe is evaluated in terms of the difference in radiation intensity measured in two states, one where the shield plate is in contact with the detecting surface and the other where it is spaced from the latter.

When the shield plate is in contact with the detecting surface, γ-rays are measured as they are emitted both from within and from the outside of the pipe. When the shield plate is spaced from the detecting surface by a specified distance, both β- and γ-rays are detected as they are emitted from the inner surfaces of the pipe defined between the detecting surface and the shield plate. The difference in radiation intensity between the two states of measurement provides the profile of contamination by β-rays.

The contamination profile on the inner surfaces of a contaminated pipe can be measured not only by a detector having a circular detecting surface on the front side but also by one having a cylindrical detecting surface on the outer circumference. In the second type of detector, a cylindrical shield cover may be slipped over the detector such that it can slide along the length of the detector to permit the measurement of radioactive contamination by β-rays.

Two embodiments of the method of the invention will now be described with reference to FIGS. 2 and 3. FIG. 2 illustrates how the contamination profile of the inner surfaces of a contaminated pipe is measured in accordance with one embodiment of the invention; indicated by 1 is a detector (which may be of a G-M type or of a plastic scintillation type), 2 is a detecting surface, 4 is a signal cable, 5 is the contaminated pipe and 6 designates the direction of movement of a shield plate 7. FIG. 3 illustrates another embodiment for measuring the contamination profile by the method of the invention; indicated by 1 is a detector (which may be of a G-M type or of a plastic scintillation type), 2 is a cylindrical detecting surface, 4 is a signal cable, 5 is the contaminated pipe and 6 designates the direction of movement of a cylindrical shield cover 8.

Figure 1:
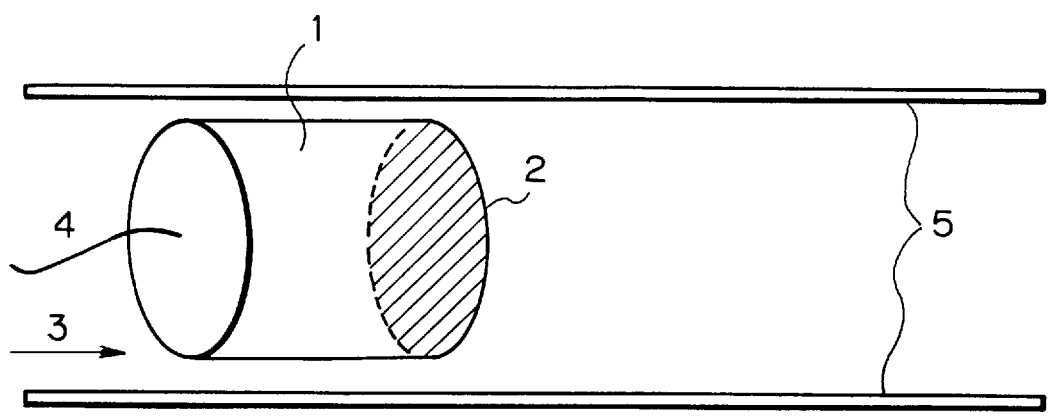
FIG. 1 illustrates a conventional method of measuring the radioactive contamination profile of the inner surfaces of a contaminated pipe using a G-M type survey meter.
Figure 2A:
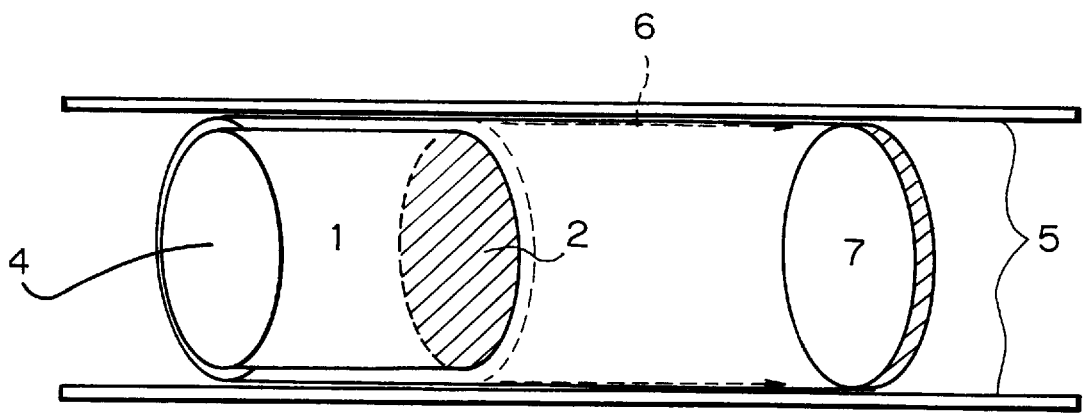
FIGS. 2a and 2b illustrate the measurement of the internal contamination of a pipe by the method of the invention using a shield disk.
Figure 3A:
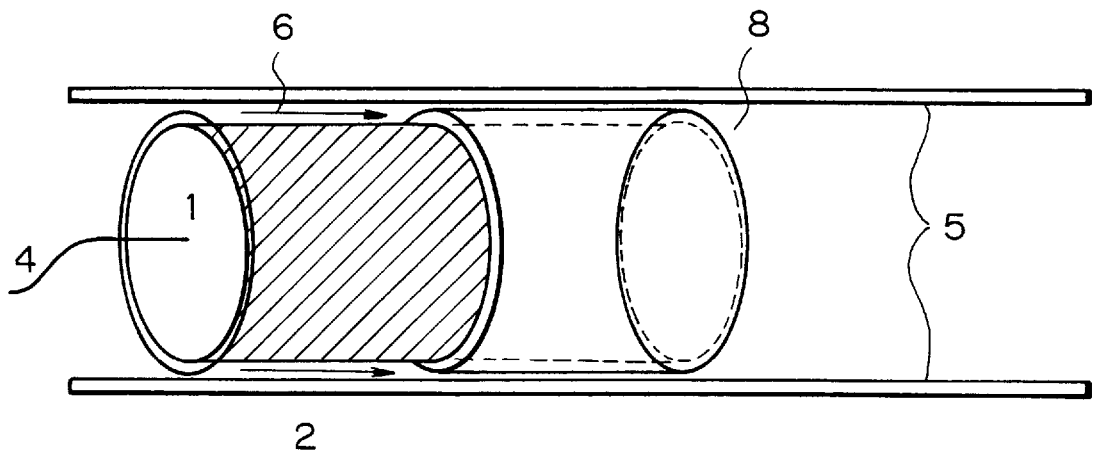
FIGS. 3a and 3b illustrate the measurement of the internal contamination of a pipe by the method of the invention using a cylindrical shield cover.

In order to specify the area over which the inner surfaces of the pipe are to be measured, the shield plate 7 or shield cover 8 which are fitted on the outside of the detecting surface of the detector 1 which is inserted into the pipe is moved by a certain distance as shown in FIG. 2a or FIG. 3a and β-rays from the inner surfaces being measured and γ-rays emitted both from within and from the outside of the pipe are measured, with β-rays other than those from the inner surfaces of interest being blocked by the shield plate or cover.

Figure 2B:
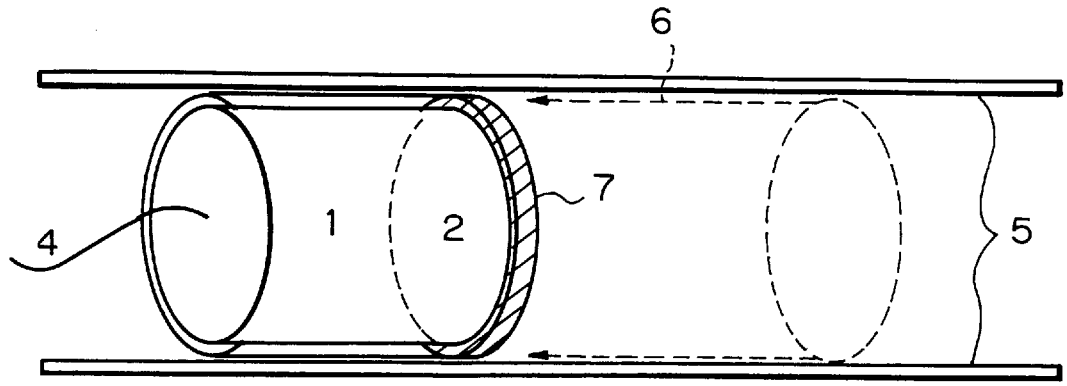
Figure 3B:
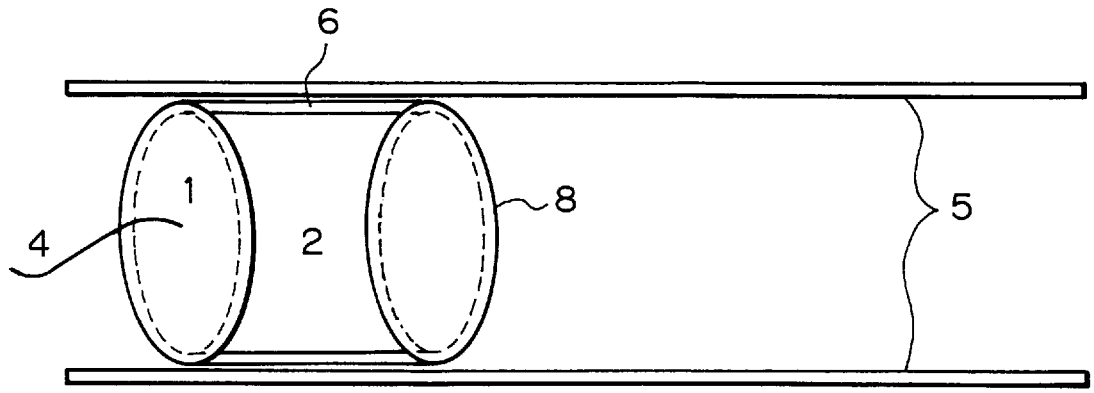

Then, with the detector being fixed in the same position, the shield plate is brought into contact with the detecting surface as shown in FIG. 2b or with the shield cover closed to cover the cylindrical detecting surface as shown in FIG. 3b. In this case, the detecting surface detects only γ-rays emitted both from within and from the outside of the pipe. The difference between the two measurements provides the counting rate of β-rays, $N_β$, as emitted from the limited inner surfaces of the pipe in accordance with the following equation:

$$N_β=(N_β+N_γ)-N_γ \quad (1)$$

where $N_β$: the counting rate of β-rays (cpm) from the specified inner surfaces of the pipe;

$N_γ$: the counting rate of γ-rays (cpm) from both within the pipe including the specified inner surfaces and from the outside of the pipe.

Obviously, in accordance with the method of the invention which specifys the area of measurement within the pipe by means of the shield plate or cover, $N_β$ can be isolated from $N_γ$ by equation (1). The surface density of β-rays from the inner surfaces of the pipe need be determined from its relationship with the counting rate of β-rays established for a mock-up contaminated pipe.

Figures 4A, 4B:
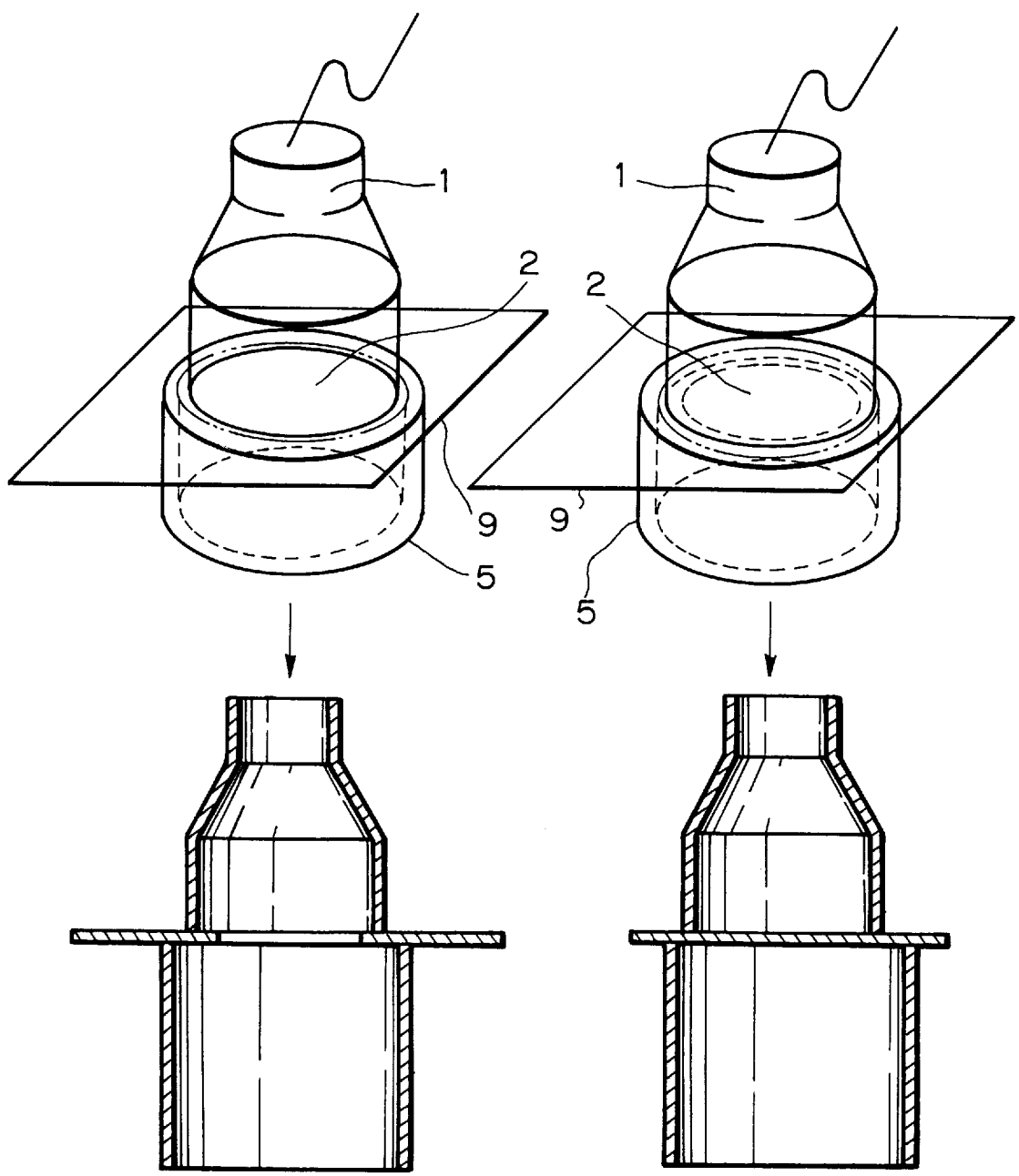
FIGS. 4a and 4b illustrate for the implementation of the method of the invention using a G-M type survey meter that can be inserted into a contaminated pipe 3 inches in bore diameter.

FIG. 4 shows a method of radioactive contamination measurement using a G-M type survey meter (SB-310 of Aloka Co., Ltd.) which is an existing detector that can be inserted into a contaminated pipe having a bore diameter of 3 inches. Numeral 1 designates the G-M type survey meter used as the detector, 2 is the detection surface, 5 is the contaminated pipe, and 9 is an aluminum shield plate which, as shown in FIG. 4a, has an opening of the same diameter as the detecting surface. In FIG. 4b, the aluminum plate 9 in contact with the detecting surface has the opening closed.

Figure 5A:
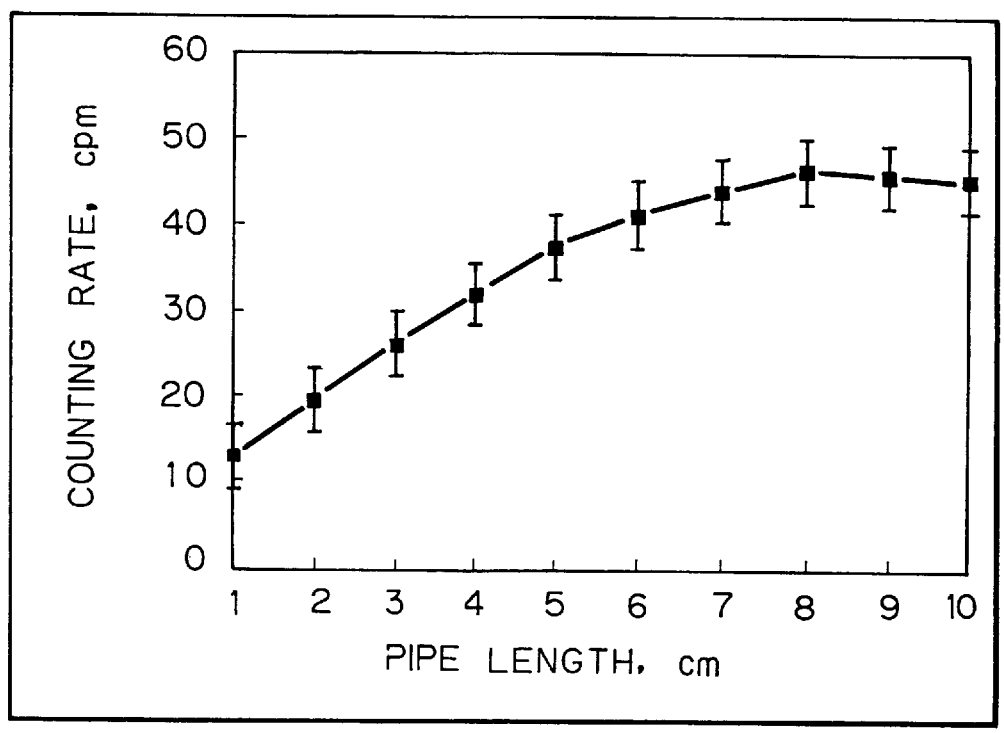
FIG. 5a is a graph showing the counting rate of β-rays (cpm) vs pipe length.
Figure 5B:
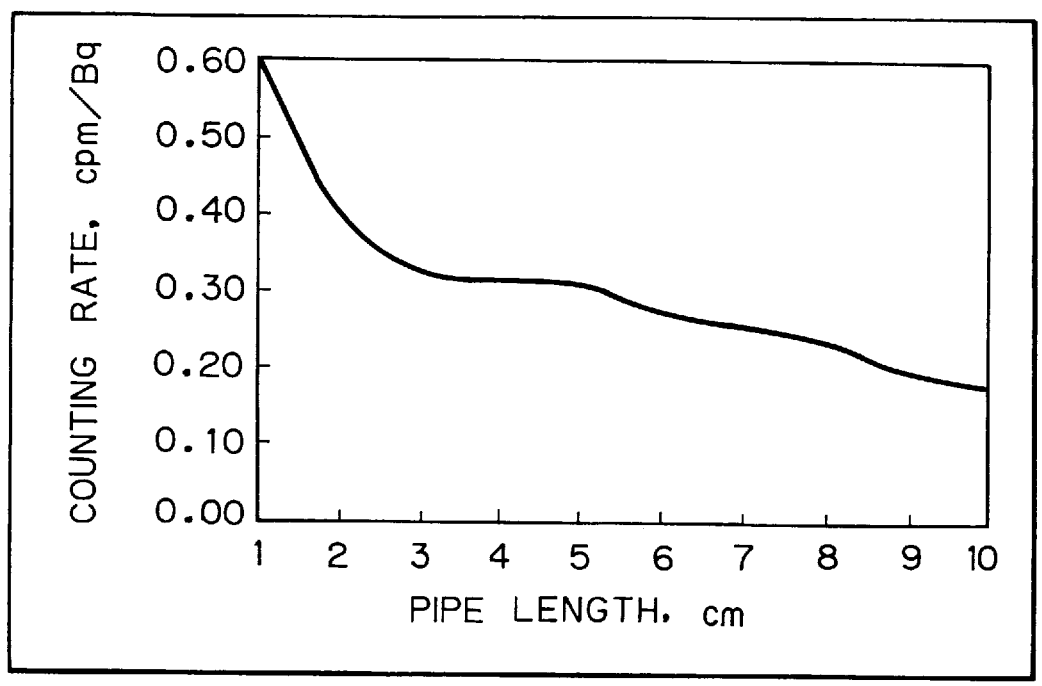
FIG. 5b is a graph showing how the counting rate of β-rays (cpm) divided by their unit radioactivity (Bq) is related to pipe length.

FIG. 5a is a graph showing the counting rate of β-rays (cpm) vs pipe length, as determined from the inner surfaces of a pipe which were provided with filter paper coated with a radiation source of 1.0 Bq/cm$^2$. FIG. 5b is a graph showing how the counting rate of β-rays (cpm) divided by their unit radioactivity (Bq) is related to pipe length. Obviously, an optimal pipe length was within the range of 3–5 cm where the counting rate of β-rays had the smallest variation with their unit radioactivity and precise measurements could be accomplished within this range.

The following example is provided for the purpose of further illustrating the invention but is in no way to be taken as limiting.

EXAMPLE

As shown in FIG. 4, an existing detector SB-310 (G-M survey meter of Aloka Co., Ltd.) was inserted into a contaminated pipe for radioactivity measurement. The detecting surface 2 of the survey meter 1 had a detection window as large as about 19.6 cm$^2$. The pipe used in the Example had a bore diameter of 3 inches and it was so cut as to permit adjustment in length. Polyethylene filter coated with $^{60}$Co of a known concentration of radioactivity was placed as a radiation source on the inner surface of the pipe. The shield plate 9 for limiting the area of measurement was an aluminum plate 1 mm thick, which was capable of blocking up to about 600 keV of β-rays.

First, in order to determine an optimal area of measurement (in terms of pipe length), the detector was inserted into the pipe through the shield plate 9 having an opening of a size comparable to the detecting surface 2 of the detector 1 as shown in FIG. 4a and the counting rates of β- and γ-rays were measured for varying pipe lengths corresponding to specified areas of measurement.

In the next step, with the opening in the shield plate 9 being closed and placed in contact with the detecting surface, the counting rate of γ-rays was measured while blocking unwanted β-rays and the counting rate of β-rays was determined by equation (1) for respective pipe length. The results are shown in FIGS. 5a and 5b. FIG. 5a depicts the counting rate of β-rays (cpm) for varying length of the pipe which was fitted on the inner surface with the filter paper coated with the radiation source of 1.0 Bq/cm$^2$, and FIG. 5b depicts the counting rate of β-rays divided by their unit radioactivity for respective pipe length.

The data in FIG. 5b shows that the counting rate of β-rays per unit radioactivity was substantially constant and had minimal variation in the pipe length range of 3–5 cm. With other values of pipe length, the variation in counting rate increased mainly due to the range of β-rays from $^{60}$Co and their counting rate per unit radioactivity decreased with the increasing pipe length. These results show that an optimal pipe length is within the range of 3–5 cm, which assures precise data of measurements.

Figure 6A:
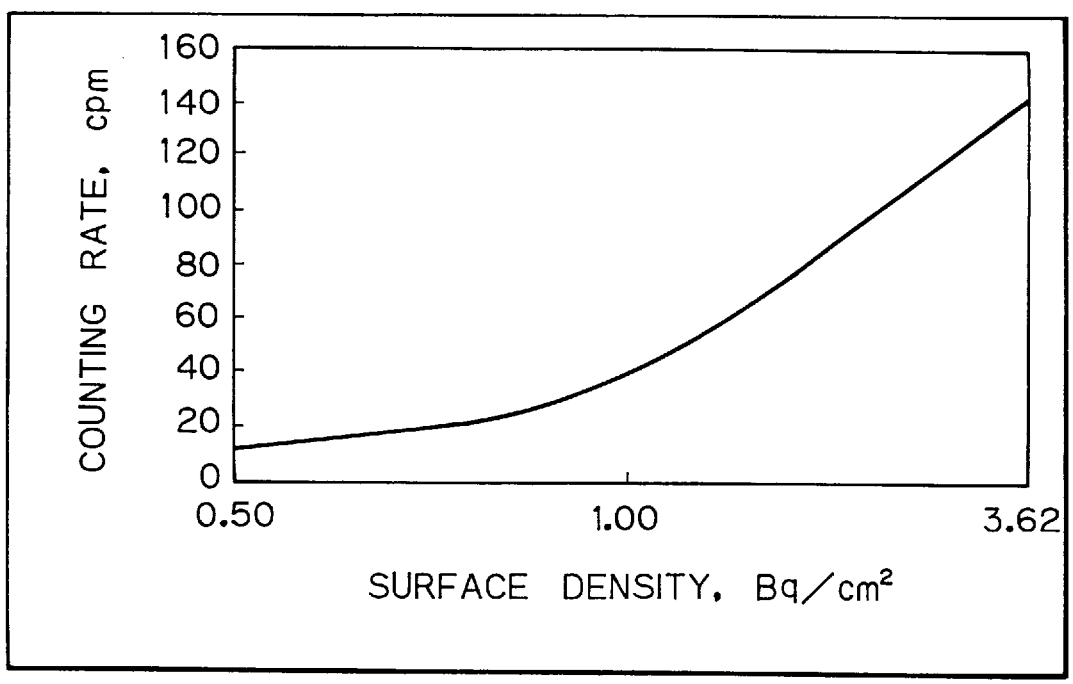
FIG. 6a is a graph showing the counting rate of β-rays from $^{60}$Co (cpm) vs their surface density (Bq/cm$^2$)
Figure 6B:
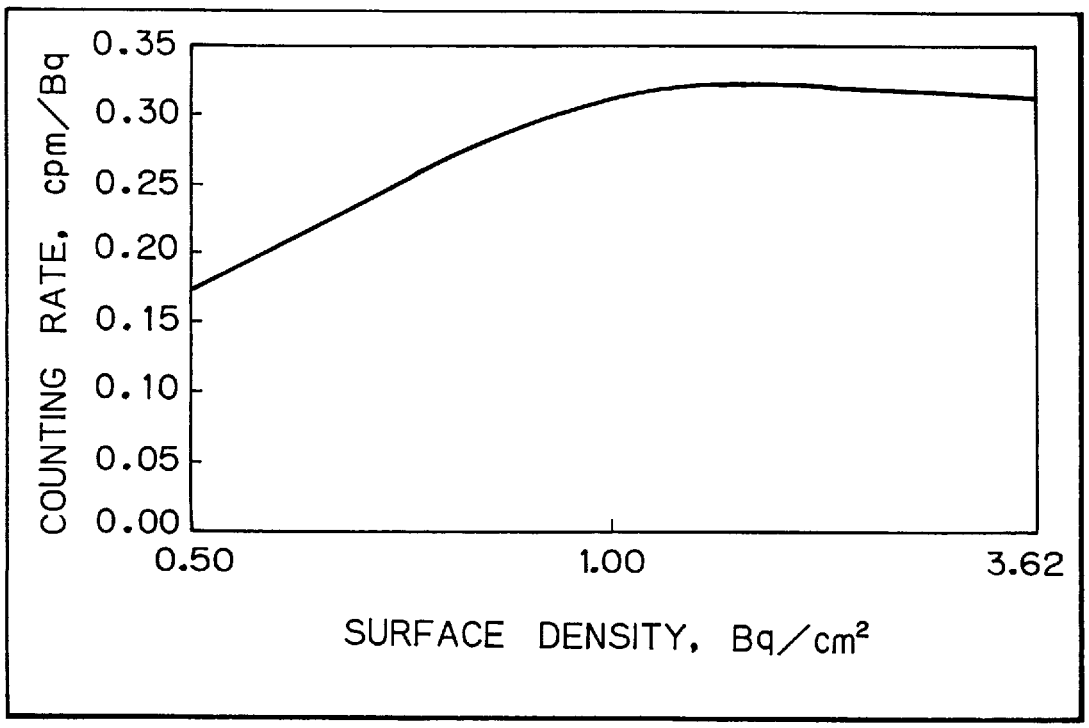
FIG. 6b is a graph showing how the counting rate of β-rays from $^{60}$Co (cpm) divided by their unit radioactivity (Bq) is related to their surface density (Bq/cm$^2$).

In the Example under consideration, there was determined the relationship between the counting rate of β-rays and their surface density on the inner surface of a pipe as measured for an optimal pipe length of 5 cm. FIG. 6a shows the counting rate (cpm) of β-rays from $^{60}$Co vs their surface density (Bq/cm$^2$). FIG. 6b shows how the counting rate of β-rays from $^{60}$Co (cpm) divided by their unit radioactivity (Bq) is related to their surface density (Bq/cm$^2$). The data in FIGS. 6a and 6b show that when the profile of radioactive contamination by β-rays from $^{60}$Co in a contaminated pipe having a bore diameter of 3 inches was measured using a G-M type survey meter in accordance with the method of the invention, measurement was possible at surface densities of 1.0 Bq/cm$^2$ and above.

As will be understood from the foregoing description, the present invention enables accurate measurement and evaluation of the radioactive contamination profile of the inner surfaces of contaminated pipes embedded within concrete structures in nuclear reactor facilities and the like. Thus, the present invention is characterized in that the profile of internal contamination by β-rays of pipes embedded in concrete structures can be measured accurately by use of a shield plate. As a result, the invention holds promise for ensuring that the profile of internal contamination of pipes embedded in concrete structures can be measured with a small detector that is inserted into the pipe, whereby it becomes possible to accomplish accurate measurement and evaluation of the radioactive contamination profile of the inner surfaces of contaminated pipes embedded within concrete structures in nuclear reactor facilities and the like.

What is claimed is:

1. A method for measuring the contamination profile of the inner surfaces of a radioactively contaminated pipe embedded within a concrete structure in a nuclear reactor facility, said method comprising fitting the detecting surface of a detector with a movable shield plate, inserting the detector into the pipe, measuring a radiation intensity within a limited area of the inner surfaces of the pipe in a first state wherein the shield plate is in contact with the detecting surface of the detector, measuring a radiation intensity within the limited area of the inner surfaces of the pipe in a second state wherein the shield plate is spaced from the detecting surface of the detector, and obtaining the contamination profile of the limited area from the differences in radiation intensity measured in the two states.

2. A method for measuring the contamination profile of the inner surfaces of a radioactively contaminated pipe embedded within a concrete structure in a nuclear reactor facility, said method comprising fitting a cylindrical detecting surface of a detector with a movable cylindrical shield cover, inserting the detector into the pipe, measuring a radiation intensity within a limited area of the inner surfaces of the pipe in a first state wherein the shield cover is in contact with the detecting surface of the detector, measuring a radiation intensity within the limited area of the inner surfaces of the pipe in a second state wherein the shield cover is spaced from the detecting surface of the detector, and obtaining the contamination profile of the limited area from the differences in radiation intensity measured in the two states.

3. The method according to claim 1 or 2, wherein the shield plate or cover is made of an aluminum material.

* * * * *